United States Patent [19]
Hashimoto

[11] Patent Number: 4,560,265
[45] Date of Patent: Dec. 24, 1985

[54] BLADE TYPE FOCAL PLANE SHUTTER

[75] Inventor: Teiji Hashimoto, Kanagawa, Japan

[73] Assignee: Canon Kabushiki Kaisha, Tokyo, Japan

[21] Appl. No.: 569,783

[22] Filed: Jan. 10, 1984

[30] Foreign Application Priority Data

Jan. 25, 1983 [JP] Japan .............................. 58-7892[U]

[51] Int. Cl.$^4$ .............................................. G03B 9/40
[52] U.S. Cl. ................................................... 354/246
[58] Field of Search ................................. 354/245–249

[56] References Cited
FOREIGN PATENT DOCUMENTS
52-22918 2/1977 Japan .................................... 354/246

Primary Examiner—John Gonzales
Attorney, Agent, or Firm—Toren, McGeady, Stanger, Goldberg & Kiel

[57] ABSTRACT

A blade type focal plane shutter in which a number of shutter blades are mounted for parallel-linked movements by two operating arms, the system for supporting the blades reducing the size of the shutter and one end of a first auxiliary blade succeeding a slit forming blade is connected to the operating arms in accordance with a relationship between the pins and the arc grooves.

2 Claims, 4 Drawing Figures

BLADE TYPE FOCAL PLANE SHUTTER

BACKGROUND OF THE INVENTION

1. Field of the Invention

The present invention relates to a blade type focal plane shutter.

2. Description of the Prior Art

Heretofore a focal plane shutter, which effects shutter operation by parallel-linked movements of shutter blades made of a plurality of opaque thin plates and two operating arms supporting the blades, has been used in a single lens reflex camera, etc., and has been generally known.

Such shutters, however, are required to have a small size so that the size of a camera, especially the height thereof can be reduced to a low level.

Therefore, in a shutter having such an arrangement the leading blade group and the trailing blade group are made of a number of blades respectively and the width of a portion at which the blades are housed in a folded manner between the view finder eyepiece part and the exposure window of a camera is made narrow while connecting parts between the shutter blades and the operating arms are made to have large widths and are housed at a side of the view finder eyepiece part. FIG. 1 and FIG. 2 show an example of a blade type focal plane shutter made to have a small size as mentioned above.

In FIG. 1,

In FIG. 1, there is shown a shutter comprising a view finder eyepiece part 1, a shutter base plate 2, and an exposure window 3 of the shutter base plate 2. A leading blade group A is positioned at a lower part, and a trailing blade group B is positioned at an upper part. Blades with opaque thin plates and operating arms constituting the leading and trailing blade groups A and B respectively have symmetrical structures and therefore similar parts are identified with similar reference characters, and respectively comprise slit forming blades 4 and first to fourth auxiliary blades 5, 6, 7, 8 which succeed the same, making a total of five blades. Operating arms 9, 10 are rotatable around shafts 11, 12 provided at a side of the exposure window 3 in the base plate 2, respectively, and rotatably supporting the slit forming blades 4 by pins 9a, 10a provided at the fore ends thereof. The shafts 11, 12 and pins 9a, 10a are positioned to form a parallelogram. The first auxiliary blade 5 succeeding the slit forming blade is pivotally supported by pins 9b, 10b provided at positions on the operating arms 9, 10 closer to the shafts 11, 12 than the pins 9a, 10a, and thus these blades and succeeding second to fourth blades, 6, 7, 8 are supported respectively by rotating pins 9a, 9b, 9c, 9d, 9e as well as 10a, 10b, 10c, 10d, 10e mounted at positions closer to the shafts 11, 12. The blade groups A and B will respectively make parallel-linked movements as the operating arms 9, 10 rotate by a movement of a driving pin (not shown) inserted into a hole 10f repectively provided in the operating arm 10.

The state shown in FIG. 1 is such that the trailing blade group B is folded up at the upper part and the leading blade group A makes a parallel movement downwards so that a portion of the exposure window 3 in the shutter base plate 2 begins to be exposed.

The most difficult problem in reducing the size of a blade type focal plane shutter of this kind of parallel-linked movement system concerns the manner in which the first auxiliary blade 5 which succeeds the slit forming blade 4 is supported. That is, while the first auxiliary blade 5 is supported at the operating arms 9, 10 respectively by the rotating pins 9b, 10b, especially for preventing the rotation pin 9b from striking the slit forming blade 4, a notched part 4a forming an escapement for the rotation pin 9b must be provided on the slit forming blade 4 as shown in FIG. 2, which shows a relationship between the slit forming blade 4 of the leading blade group A and the operating arm 9 thereof. And while the distance between the rotation pins 9a and 9b may be made large in order to reduce the amount of the escapement, the position of the rotation pin 9b is limited in connection with a moving distance (stroke) of the blades.

Therefore, heretofore, the distance between the rotation pin 9a and the rotation pin 9b has been, along with sizes of the supporting spans for the operating arms 9, 10, made as long as possible and at the same time the position of the rotation pin 9b is set so as to be shifted to the counterclockwise direction in the drawing around the rotation pin 9a so that a tail part 4b is left at the left end of the slit forming blade 4. Also, a protruding part 4c is formed for supporting the rotation pin 10a at a position shifted to the clockwise direction. Therefore, any defect will not be generated in the slit forming part and the escapement of the rotation pin 9b can be made small, whereby there will be no gaps generated between blades in the course of an operation.

The protruding part 4c is housed in a space below the exposure window under a state in which the leading blade group A is folded downwards, while that for the trailing blade group is housed in a space in a shoulder part 13 of the base plate 2 when the trailing blade group is folded upwards.

Now, in order to reduce the size of this kind of blade type focal plane shutter, the space of the shoulder part 13 should not be used, but for that end the above-mentioned protruding part 4c should not be present at the slit forming blade 4. However, when the protruding part 4c is not provided at the slit forming blade 4, the position of the rotation pin 10a is unavoidably located at an upper area compared to the position shown in FIG. 2, and along with the same the positions of the rotation pin 10b and the rotation pin 9b move to upper positions. Since a parallelogram must be formed together with the rotation pin 10a and the rotation pin 9a, in order to prevent the rotation pin 9b from striking the tail part 4b at the left end of the slit forming blade 4 in FIG. 2 when the leading blade group A moves downwards, the tail portion 4b needs to be cut off and the escapement provided by the notched part 4a becomes large. Accordingly, there will be a disadvantage in that a complete slit part cannot be formed between both blade groups at the time of an exposure and an exposure window can-not be completely covered during the blade operation, causing leakage of light.

SUMMARY OF THE INVENTION

The present invention is intended to provide a blade type focal plane shutter in which supporting of the blades without requiring a space for a shoulder part of a shutter base plate as in the above-mentioned conventional example can be achieved wherein and at the same time operation thereof can be effected reliably and securely for the size of the camera.

The present invention provides, in a focal plane shutter which makes a parallel-linked movement such as mentioned above, an arrangement wherein a first auxiliary blade which succeeds a slit forming blade is connected to one of the operating arms with a pin and an arc groove so that the first auxiliary blade makes a parallel movement, thereby locating the pin at a position far from a supporting shaft of the slit forming blade, and accordingly a protruding part for connecting the slit forming blade to the other operating arm is eliminated.

As a result, when the shutter blade group is folded at a location between an exposure window and a view finder eyepiece part the connecting part will not protrude out of the upper side of the shutter blade, and therefore the space at the shoulder part in a shutter base plate of the conventional example becomes unnecessary. Therefore the space at a side of a view finder eyepiece part of a camera can be effectively utilized for some other camera mechanism.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWINGS

FIG. 2 is an illustration showing an attaching relationship between the slit forming shutter blade and one operating arm.

DESCRIPTION OF THE PREFERRED EMBODIMENTS

Figure 1:
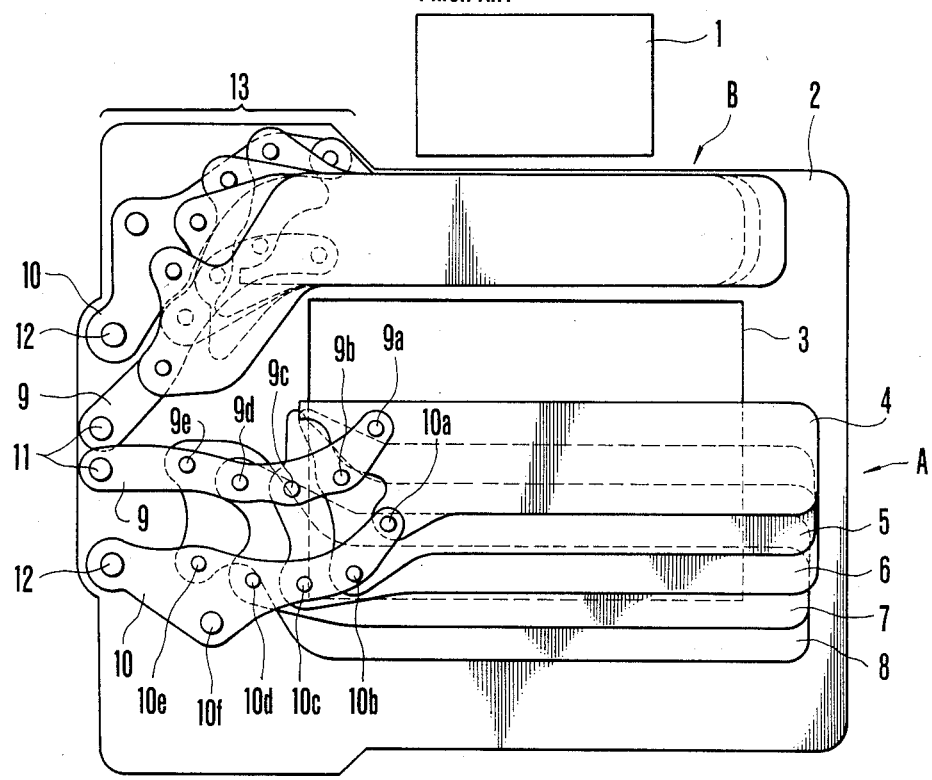
FIG. 1 and FIG. 2, both show an example of a conventional arrangement, with FIG. 1 being an illustration of a blade type focal plane shutter comprising an example of a conventional arrangement.
Figure 2:
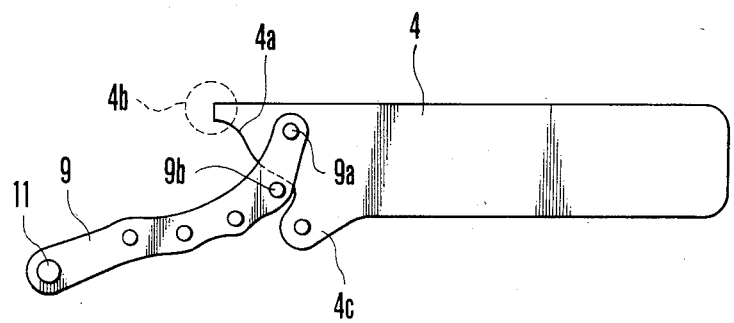
Figure 3:
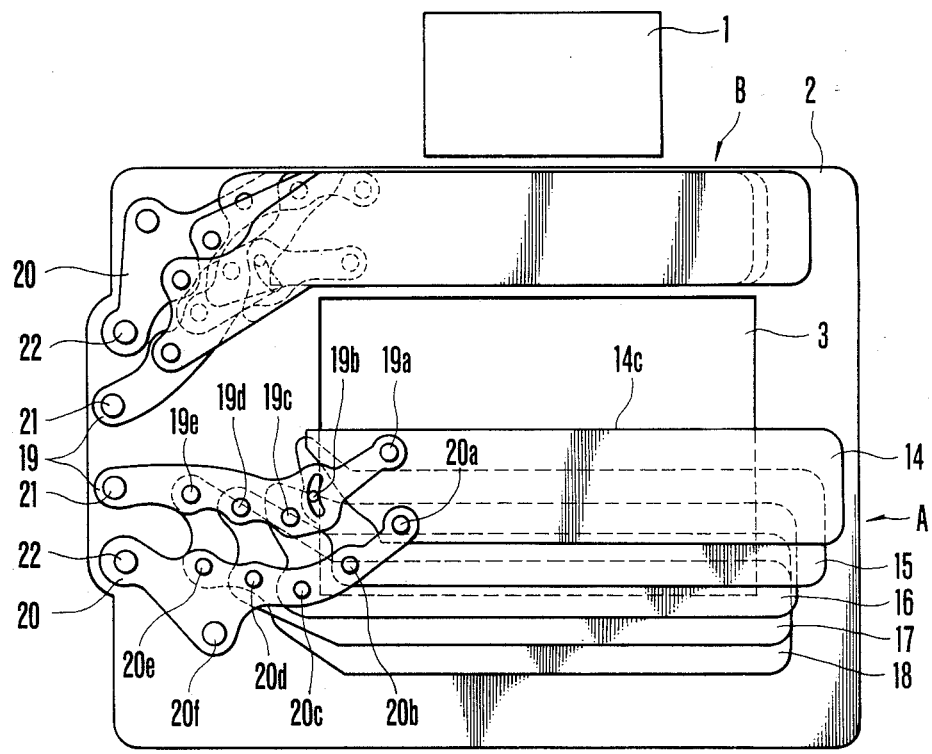
FIG. 3 is an illustration showing an arrangement of blades in an embodiment of a blade type focal plane shutter according to the present invention.
Figure 4:
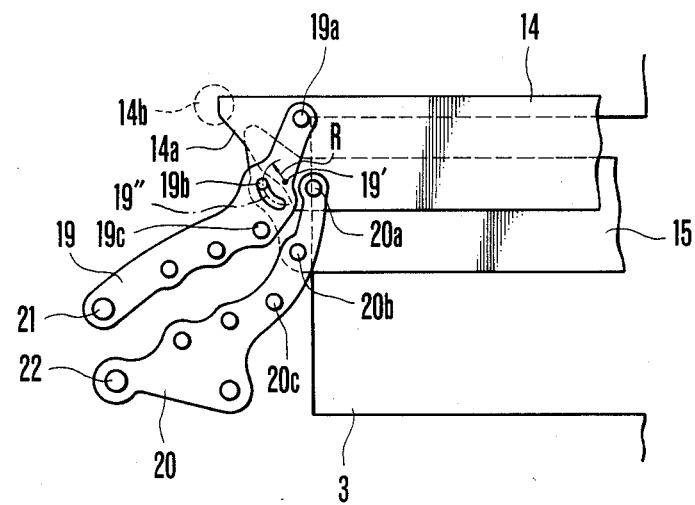
FIG. 4 is an illustration showing an attaching relationship between the slit forming blade as well as a first auxiliary blade with operating arms therefor.

FIG. 3 and FIG. 4 show an embodiment of a blade type focal plane shutter according to the present invention, wherein parts similar to those in the example of the conventional arrangement shown in FIG. 1 are identified with reference characters and description thereof is omitted in the present invention, the shoulder part 13 in the shutter base plate 2 of the example of the conventional arrangement is eliminated, and further a protruding part of a slit forming blade is eliminated.

In FIG. 3, a leading blade group A is positioned at a lower part while a trailing blade group B is positioned at an upper part, and blades with opaque thin plates constituting each blade group A and B and operating arms therefor have symmetrical structures as in the above-mentioned example of the conventional arrangement. The leading blade group A comprises a slit forming blade 14 and succeeding first to fourth anxiliary blades 15, 16, 17, 18 for light shielding, making a total of five blades. The slit forming blade 14 and the first to fourth auxiliary blades for light shielding 15, 16, 17, 18 are arranged in parallel, wherein each blade is pivotally supported on operating arms 19, 20 which rotate respectively around shafts 21, 22 provided on the base plate 2, respectively by rotation pins 19a, 19b, 19c, 19d, 19e as well as 20a, 20b, 20c, 20d, 20e mounted on each blade, the distance between the pin 19a on the first operating arm 19 supporting a portion of the slit forming blade 14 near a slit forming edge 14c and the pin 20a on the second operating arm 20 supporting a portion of the same blade 14 being far from said edge 14c will be within a width of the blade 14. Also, a driving pin (not shown) is inserted in the hole 20f provided at the operating arm 20, and the operating arm 20 is rotated by movement of the driving pin.

With regard to the attachment of the rotation pin 19b of the first auxiliary blade 15 to the first operating arm 19, the point 19' on the operating arm 19 in FIG. 4 is a theoretically correct position for supporting the first auxiliary blade 15, and the position 19' is as set as facing the rotation pin 20b of the second operating arm 20 and forming a parallelogram together with the shafts 21, 22 as in the case of the rotation pins 19a and 20a of the slit forming blade 14. The present invention is arranged to provide the rotation pin 19b at an appropriate position on an arc with a radius of R around the point 19' that is being shifted to the adjacent rotation pin 19c side, and the rotation pin 19b is made to engage with an arc groove 19" with the above-mentioned radius R provided on the operating arm 19. Therefore, a notched part 14a for an escapement of the rotation pin 19b for preventing the same from striking the slit forming blade 14 can be made small, and a tail part 14b at the left end thereof can be left in a large size. Here the size of the radius R may be suitably determined so as not to strike the adjacent rotation pin 19c. Also, supporting of second to fourth anxiliary blades 16, 17, 18 at the operating arms 19, 20 may be the same as in the example for the conventional arrangement since the positions of the rotation pins 19c, 19d, 19e as well as 20c, 20d, 20e are outside the exposure window and thus there will be no problem.

In the operation of the embodiment described with the shutter charged, the leading blade group A moves up to close the exposure window 3, while the trailing blade group B is folded at the position above the exposure window 3. Under this state, when the shutter is released, the first operating arm 19 for the leading blade group A together with the second operating arm 20 rotates as seen in the clockwise direction in the drawing for shifting the leading blade group A downwards by a parallel-linked movement. At this time, the rotation pin 19b moves along the arc groove 19" on the operating arm 19 and makes exactly the same movement as in the case wherein a center of rotation is located at the point 19' against the operation of the operating arm 19, therefore, the first anxiliary blade 15 makes parallel movements together with the slit forming blade 14. The state shown in FIG. 3 is such that the leading blade group A moves downwards and starts to open a portion of the exposure window 3.

The leading blade group A is folded at a position below the exposure window 3, and then on the other hand the trailing blade group B moves downwards after an elaspse of a prescribed period of time for closing the exposure window 3, thus completing an exposure, as in the example of the conventional arrangement.

Also, while the arc groove 19" is provided on the operating arm 19 in the above-mentioned embodiment, the rotation pin may be mounted on the operation arm and the arc groove may be provided at the blade side.

However, in such a case, directions of caulking for fixing each rotation pin will not be uniform, which is not desirable from the standpoint of mechanical fabrication.

The position of the one of rotation pins which serves as a fulcrum for a first auxiliary blade which is succeeding a slit forming blade can be shifted outside a normal position in a parallel-linked mechanism as in the example of the conventional arrangement in the present invention as has been explained above, and as a result, the slit forming blade can be designed to have a large size. Further, the space for a shoulder portion at the left side of a shutter base plate as viewed from a front end of a camera becomes unnecessary, and the space can be utilized for parts other than a shutter as required, so that a reduction in the total size of the camera can be achieved.

What I claim:

1. A blade type focal plane shutter, comprising:
    a shutter base plate having an exposure window;
    a slit forming blade and a plurality of auxiliary blades for light shielding, respectively made of opaque thin plates; and
    a first operating arm and a second operating arm which can rotate around shafts provided at one side of the exposure window in the shutter base plate and pivotally support the blades, causing the same to make parallel-linked movements, said first operating arm pivotally supporting one end of the slit forming blade at a side thereof near a slit forming edge thereof, and the second operating arm pivotally supporting the same end of the slit forming blade at an opposite side thereof further from the slit forming edge,
    wherein the first auxiliary blade next succeeding the slit forming blade has its one end pivotally supported on one side thereof at the second operating arm, while the other side of said one end thereof is connected to the first operating arm with an arc groove and a pin and wherein a center of the radius of the arc forms a parallelogram together with two shafts of the two operating arms and a pivotally supporting point of the first auxiliary blade.

2. A shutter according to claim 1, wherein said arc groove is provided at said first operating arm.

* * * * *